(12) United States Patent
Hsu

(10) Patent No.: US 9,695,074 B2
(45) Date of Patent: Jul. 4, 2017

(54) DEVICE FOR GENERATING HIGH PRESSURE OZONE WATER BY USING LOW PRESSURE OZONE GAS SOURCE

(71) Applicant: BIOTEK ENVIRONMENTAL SCIENCE LTD., New Taipei (TW)

(72) Inventor: Mingyung Hsu, New Taipei (TW)

(73) Assignee: BIOTEK ENVIRONMENTAL SCIENCE LTD., New Taipei (TW)

( * ) Notice: Subject to any disclaimer, the term of this patent is extended or adjusted under 35 U.S.C. 154(b) by 77 days.

(21) Appl. No.: 14/817,918

(22) Filed: Aug. 4, 2015

(65) Prior Publication Data

US 2016/0039692 A1    Feb. 11, 2016

(30) Foreign Application Priority Data

Aug. 5, 2014    (CN) .......................... 2014 1 03801228

(51) Int. Cl.
*C02F 1/78* (2006.01)
*B01F 3/04* (2006.01)

(52) U.S. Cl.
CPC ............ *C02F 1/78* (2013.01); *B01F 3/04985* (2013.01); *B01F 2003/04886* (2013.01); *C02F 2201/782* (2013.01); *C02F 2303/04* (2013.01)

(58) Field of Classification Search
CPC ........................................................ C02F 1/78
USPC .................................................. 210/760, 739
See application file for complete search history.

(56) References Cited

U.S. PATENT DOCUMENTS 6,585,898 B1 *    7/2003    Ekberg ................. A61L 2/0088
                                                                210/101

* cited by examiner

*Primary Examiner* — Robert A Hopkins
(74) *Attorney, Agent, or Firm* — Chun-Ming Shih

(57) ABSTRACT

A device for generating high pressure ozone water by using a low pressure ozone gas source includes an ozone gas and water mixture bucket. A water inlet of the ozone gas and water mixture bucket is connected with a tap water inlet through a pipe system and a water inlet solenoid valve. A water outlet of the ozone gas and water mixture bucket is connected with a water outlet through the pipe system and a water outlet one-way valve. An ozone gas inlet of the ozone gas and water mixture bucket is connected with an ozone inlet through the pipe system and an ozone gas inlet one-way valve. The ozone gas and water mixture bucket is provided with an off-gas outlet. The off-gas outlet is connected with a discharge outlet through the off-gas destruct bucket. The water inlet solenoid valve is connected with a power control unit.

7 Claims, 1 Drawing Sheet

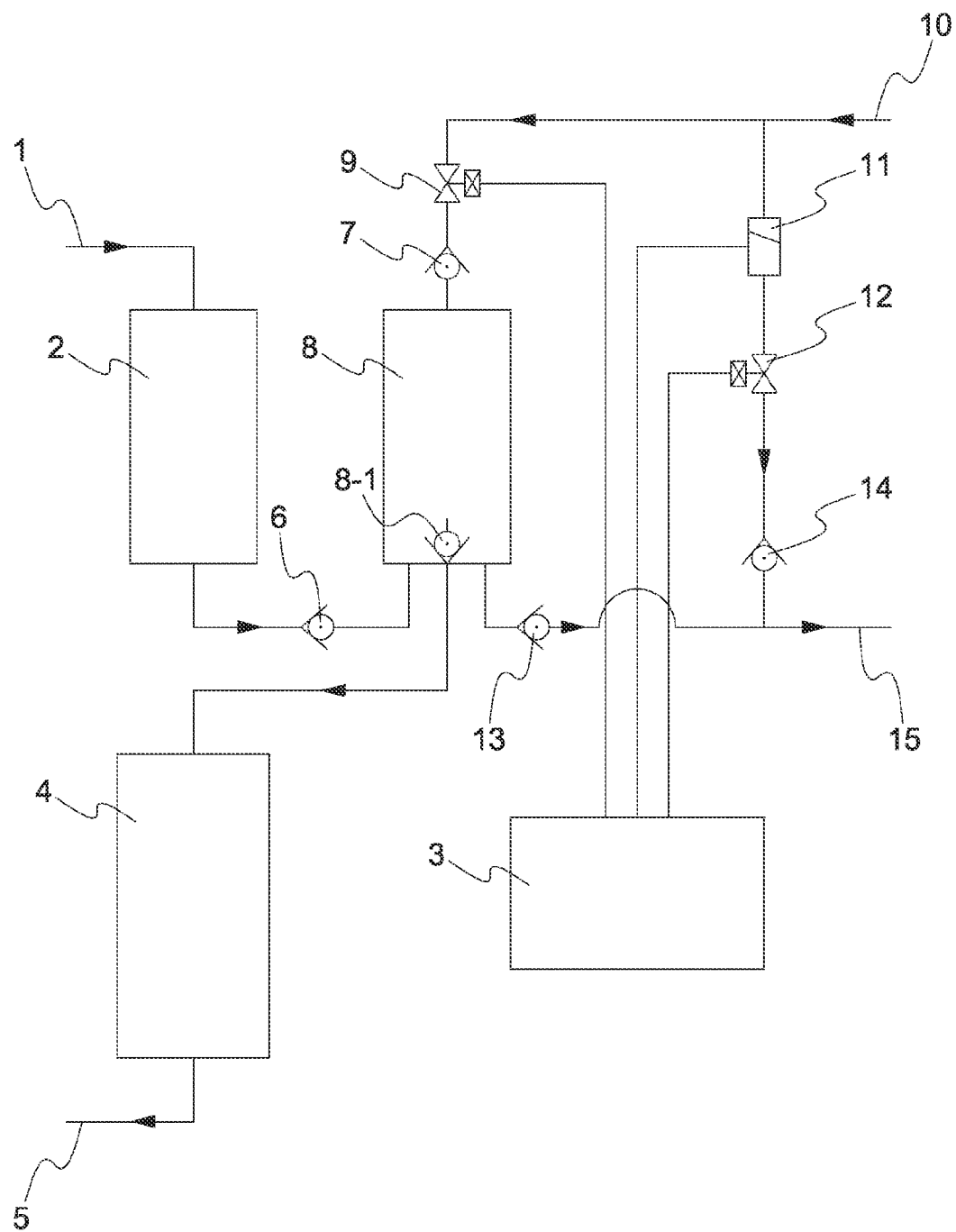

DEVICE FOR GENERATING HIGH PRESSURE OZONE WATER BY USING LOW PRESSURE OZONE GAS SOURCE

BACKGROUND OF THE INVENTION

1. Field of the Invention

The present invention relates to an ozone generator, and more particularly to a device for generating high pressure ozone water by using a low pressure ozone gas source.

2. Description of the Prior Art

Because ice cubes made by ice makers are contaminated easily by bacteria, saccharomycetes, fungi, mold and other microorganisms. Filtered water to remove chlorine is more serious. For the ice cubes provided by some well-known fast food restaurants, the level of bacteria is often above the threshold and disclosed by the media. This not only affects people's health seriously but also brings big troubles to business activities of the catering industry. Similar application fields, such as beverage machines, dialysis machines, dental machines, and so on also have the same problem Ozone water as efficient, broad-spectrum, non-residual sterilization techniques can be applied to these fields. Now, some ice makers and similar equipment in other filed use ozone water for disinfection and sterilization. Because the ice maker or similar equipment in other field is provided with throttles therein, it needs more than 1.5 Kg/cm² high pressure water. Based on this reason, the structure of the equipment becomes complicated. Some low pressure ozone water machines applied to ice makers and similar devices in other filed, need to change the mechanical structure or circuit control system of the ice makers and similar devices in other filed. Accordingly, the inventor of the present invention has devoted himself based on his many years of practical experiences to solve these problems.

SUMMARY OF THE INVENTION

The primary object of the present invention is to provide a device for generating high pressure ozone water by using a low pressure ozone gas source. The device has a simple structure, lower cost and a better effect for sterilization, and is beneficial for people's health and safe for use. The output water pressure of the ozone water is close to the input tap water pressure. There is no need for the ice maker or the like to make any change by using a low pressure ozone gas source to generate high pressure ozone water.

To achieve the aforesaid object, the device for generating high pressure ozone water by using a low pressure ozone gas source of the present invention comprises an ozone gas and water mixture bucket. A water inlet of the ozone gas and water mixture bucket is connected with a tap water inlet through a pipe system and a water inlet solenoid valve. A water outlet of the ozone gas and water mixture bucket is connected with a water outlet through the pipe system and a water outlet one-way valve. An ozone gas inlet of the ozone gas and water mixture bucket is connected with an ozone inlet through the pipe system and an ozone gas inlet one-way valve. The ozone gas and water mixture bucket is provided with an off-gas outlet. The off-gas outlet is connected with a discharge outlet through the off-gas destruct bucket. The water inlet solenoid valve is connected with a power control unit.

Preferably, the device comprises at least one ozone gas and water mixture bucket. The water inlet of each ozone gas and water mixture bucket is respectively connected with the tap water inlet through the pipe system and the water inlet solenoid valve. The water outlet of each ozone gas and water mixture bucket is respectively connected with the water outlet through the pipe system and the water outlet one-way valve. The ozone gas inlet of each ozone gas and water mixture bucket is respectively connected with the ozone inlet through the pipe system and the ozone gas inlet one-way valve. Each ozone gas and water mixture bucket is provided with the off-gas outlet. The off-gas outlet is connected with the discharge outlet through the off-gas destruct bucket. The water inlet solenoid valve is connected with the power control unit.

Preferably, the water inlet of each ozone gas and water mixture bucket is respectively connected with the water inlet solenoid valve through a water inlet one-way valve.

Preferably, the ozone gas inlet one-way valve is connected with an air outlet of a buffer bucket, and an ozone gas inlet of the buffer bucket is connected with the ozone inlet.

Preferably, the off-gas outlet is connected with an inlet of a off-gas destruct bucket, and an outlet of the off-gas destruct bucket is connected with the discharge outlet.

Preferably, the tap water inlet is connected with an inlet of a flow switch, an outlet of the flow switch is connected with an inlet of a bypass solenoid valve, an outlet of the bypass solenoid valve is connected with the water outlet through a one-way valve, and the flow switch and the bypass solenoid valve are connected with a power control unit, respectively.

Preferably, the bypass solenoid valve is a normally open solenoid valve.

Preferably, the off-gas outlet is an aperture, and the off-gas outlet is higher than the water outlet of the ozone gas and water mixture bucket.

Compared to the prior art, the present invention has the following effects. The device is to generate high pressure ozone water as close to input tap water pressure by using a low pressure ozone gas source. There is no need for the ice maker or the like apparatus to make any change. The high pressure ozone water can be poured into the pipe system of the apparatus for disinfection and sterilization, enabling the products to be more acceptable on the market. For some apparatuses (such as ice makers), ozone water is provided to enter the pipe system and valves of the apparatuses for disinfection and sterilization. After that, purified water flows through the pipe system and the valves. The time for the pipe system and the valves to contact the ozone water is short, so the service life of the pipe system and the valves can be prolonged.

BRIEF DESCRIPTION OF THE DRAWINGS

The FIGURE is a schematic view according to a preferred embodiment of the present invention.

DETAILED DESCRIPTION OF THE PREFERRED EMBODIMENTS

Embodiments of the present invention will now be described, by way of example only, with reference to the accompanying drawings.

As shown in The FIGURE, the present invention discloses a device for generating high pressure ozone water by using a low pressure ozone gas source. The device comprises an ozone gas and water mixture bucket 8. A water inlet of the ozone gas and water mixture bucket 8 is connected with a tap water inlet 10 through a pipe system, a water inlet one-way valve 7, and a water inlet solenoid valve 9. A water outlet of the ozone gas and water mixture bucket 8 is connected with a water outlet 15 through the pipe system and a water outlet one-way valve 13. An ozone gas inlet of the ozone gas and water mixture bucket 8 is connected with an air outlet of a buffer bucket 2 through the pipe system and an air inlet one-way valve 6. The ozone gas and water mixture bucket 8 is provided with an off-gas outlet 8-1. The off-gas outlet 8-1 is an aperture. The off-gas outlet 8-1 is higher than the water outlet of the ozone gas and water mixture bucket 8. The off-gas outlet 8-1 is connected with an inlet of a off-gas destruct bucket 4 through the pipe system. An outlet of the reduction bucket 4 is connected with a discharge outlet 5. An ozone gas inlet of the buffer bucket 2 is connected with an ozone inlet 1. An inlet of a flow switch 11 is connected with the tap water inlet 10. An outlet of the flow switch 11 is connected with an inlet of a bypass solenoid valve 12. An outlet of the bypass solenoid valve 12 is connected with the water outlet 15 through a one-way valve 14. The flow switch 11, the water inlet solenoid valve 9, and the bypass solenoid valve 12 are connected with a power control unit 3, respectively. The bypass solenoid valve 12 is a normally open solenoid valve.

In general, the water inlet solenoid valve 9 is in a closed state and the bypass solenoid valve 12 is in an open state. The bypass solenoid valve 12 can be a normally open solenoid valve. The ozone generated by the ozone gas source passes through the ozone inlet 1 to enter the buffer bucket 2, and then flows to the ozone gas and water mixture bucket 8 through the ozone gas outlet of the buffer bucket 2, the ozone gas inlet one-way valve 6, and the ozone gas inlet of the ozone gas and water mixture bucket 8. The redundant ozone gas flows to the off-gas destruct bucket 4 through the off-gas outlet 8-1 and the inlet of the off-gas destruct bucket 4 to be reduced to oxygen. The oxygen is discharged through the discharge outlet 5. When an ice maker or the like apparatus needs water, the flow switch 11 detects the signal, the bypass solenoid valve 12 is closed and the water inlet solenoid valve 9 is opened by the control of the power control unit 3. The running water or purified water passes through the tap water inlet 10, the water inlet solenoid valve 9, and the water inlet of the ozone water mixture bucket 8 to the ozone gas and water mixture bucket 8 to mix with the ozone. The off-gas outlet 8-1 is an aperture. The ozone water sinks to the bottom of the ozone water mixture bucket 8 to cover the off-gas outlet 8-1. Only a little ozone water passes through the off-gas outlet 8-1 to flow out. The ozone is stored in the upper portion of the ozone gas and water mixture bucket 8. The pressure in the ozone gas and water mixture bucket 8 quickly increase close to the tap water inlet pressure to generate the high pressure ozone water. The high pressure ozone water flows to the pipe system through the water outlet one-way valve 13 and the water outlet 15. At this time, the inner pressure of the ozone gas and water mixture bucket 8 is high. The ozone gas generated by the ozone gas source cannot enter the ozone gas and water mixture bucket 8 and is stored in the buffer bucket 2, such that the pressure in the buffer bucket 2 gradually increases. During usage of the ozone water, the ozone gas inlet one-way valve 6 may have a slight leakage. Little water may flow to the buffer bucket 2. Another function of the buffer bucket 2 is to prevent water from flowing to the ozone gas source to damage the ozone gas source. After a period of time to supply high pressure ozone water for the demand of the ice maker or the like apparatus, the bypass solenoid valve 12 is opened and the water inlet solenoid valve 9 is closed by the control of the power control unit 3. The running water or purified water passes through the tap water inlet 10, the flow switch 11, and the bypass solenoid valve 12 to supply the running water continuously to the apparatus for washing away the ozone water of the pipe system and the valves. The power control unit 3 ignores the signal of the flow at this moment. After the water inlet solenoid valve 9 is closed, the ozone gas and water in the ozone water mixture bucket 8 slowly flows to the off-gas destruct bucket 4 through the off-gas outlet 8-1, so that the pressure in the ozone gas and water mixture bucket 8 gradually reduces. When the pressure in the buffer bucket 2 reaches a balance, the ozone stored in the buffer bucket 2 flows to the ozone gas and water mixture bucket 8 to compress the water therein to enter the off-gas destruct bucket 4 through the off-gas outlet 8-1. The ozone water is reduced to be discharged through the discharge outlet 5 until it is discharged fully for next use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A device for generating high pressure ozone water by using a low pressure ozone gas source, comprising an ozone gas and water mixture bucket, a water inlet of the ozone water mixture bucket being connected with a tap water inlet through a pipe system and a water inlet solenoid valve; a water outlet of the ozone gas and water mixture bucket being connected with a water outlet through the pipe system and a water outlet one-way valve; an ozone gas inlet of the ozone gas and water mixture bucket being connected with an ozone gas inlet through the pipe system and an ozone gas inlet one-way valve; the ozone gas and water mixture bucket being provided with an off-gas outlet, the aeration opening being connected with a discharge outlet through an off-gas destruct bucket; the water inlet solenoid valve being connected with a power control unit, wherein the ozone as inlet one-way valve is connected with an ozone as outlet of a buffer bucket, and an air inlet of the buffer bucket is connected with the ozone inlet.

2. The device for generating high pressure ozone water by using a low pressure ozone gas source as claimed in claim 1, comprising at least one ozone gas and water mixture bucket, the water inlet of each ozone gas and water mixture bucket being respectively connected with the tap water inlet through the pipe system and the water inlet solenoid valve; the water outlet of each ozone gas and water mixture bucket being respectively connected with the water outlet through the pipe system and the water outlet one-way valve; the ozone gas inlet of each ozone gas and water mixture bucket being respectively connected with the ozone gas inlet through the pipe system and the ozone gas inlet one-way valve; each ozone gas and water mixture bucket being provided with the off-gas outlet, the aeration opening being connected with the discharge outlet through the off-gas destruct bucket; the water inlet solenoid valve being connected with the power control unit.

3. The device for generating high pressure ozone water by using a low pressure ozone gas source as claimed in claim 1, wherein the water inlet of each ozone gas and water mixture bucket is respectively connected with the tap water inlet solenoid valve through a water inlet one-way valve.

4. The device for generating high pressure ozone water by using a low pressure ozone gas source as claimed in claim 1, wherein the off-gas outlet is connected with an inlet of the off-gas destruct bucket, and an outlet of the off-gas destruct bucket is connected with the discharge outlet.

5. The device for generating high pressure ozone water by using a low pressure ozone gas source as claimed in claim 1, wherein the off-gas outlet is an aperture, and the off-gas outlet is higher than the water outlet of the ozone gas and water mixture bucket.

6. A device for generating high pressure ozone water by using a low pressure ozone gas source, comprising an ozone gas and water mixture bucket, a water inlet of the ozone water mixture bucket being connected with a tap water inlet through a pipe system and a water inlet solenoid valve; a water outlet of the ozone gas and water mixture bucket being connected with a water outlet through the pipe system and a water outlet one-way valve; an ozone gas inlet of the ozone gas and water mixture bucket being connected with an ozone gas inlet through the pipe system and an ozone gas inlet one-way valve; the ozone gas and water mixture bucket being provided with an off-gas outlet, the aeration opening being connected with a discharge outlet through an off-gas destruct bucket; the water inlet solenoid valve being connected with a power control unit, wherein the tap water inlet is connected with an inlet of a flow switch, an outlet of the flow switch is connected with an inlet of a bypass solenoid valve, an outlet of the bypass solenoid valve is connected with the water outlet through a one-way valve, and the flow switch and the bypass solenoid valve are connected with a power control unit, respectively.

7. The device for generating high pressure ozone water by using a low pressure ozone gas source as claimed in claim 6, wherein the bypass solenoid valve is a normally open solenoid valve.

\* \* \* \* \*